US011812389B2

(12) United States Patent
Huang et al.

(10) Patent No.: US 11,812,389 B2
(45) Date of Patent: Nov. 7, 2023

(54) THERMAL MANAGEMENT METHOD FOR MULTIPLE HEAT SOURCES AND WIRELESS COMMUNICATION APPARATUS HAVING MULTIPLE HEAT SOURCES

(71) Applicant: GIGA-BYTE TECHNOLOGY CO., LTD., New Taipei (TW)

(72) Inventors: Ching-Hsun Huang, New Taipei (TW); Tse-Hsien Liao, New Taipei (TW); Po-Jen Shih, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 478 days.

(21) Appl. No.: 17/211,788

(22) Filed: Mar. 24, 2021

(65) Prior Publication Data

US 2021/0377869 A1 Dec. 2, 2021

(30) Foreign Application Priority Data

May 29, 2020 (TW) ................................ 109118211

(51) Int. Cl.
*H04W 52/02* (2009.01)
*G06F 1/20* (2006.01)
*G08B 21/18* (2006.01)

(52) U.S. Cl.
CPC ........ *H04W 52/0261* (2013.01); *G06F 1/206* (2013.01); *G08B 21/182* (2013.01)

(58) Field of Classification Search
CPC ... H04W 52/0261; G06F 1/206; G08B 21/182
See application file for complete search history.

(56) References Cited

U.S. PATENT DOCUMENTS

2005/0030171 A1* 2/2005 Liu .................... G06F 1/206
340/500
2014/0054024 A1* 2/2014 Chen .................. H05K 7/20836
417/44.1

(Continued)

FOREIGN PATENT DOCUMENTS

CN 102298431 A 12/2011
CN 103821747 B 7/2016

(Continued)

OTHER PUBLICATIONS

First Office Action of the corresponding China patent application No. 202010477859.7 dated Apr. 25, 2023.

(Continued)

*Primary Examiner* — Moustapha Diaby
(74) *Attorney, Agent, or Firm* — Idea Intellectual Limited; Margaret A. Burke; Sam T. Yip

(57) ABSTRACT

A thermal management method is applicable to a wireless communication apparatus. The wireless communication apparatus includes at least a wireless communication module, a heat source set, a thermally conductive assembly, a heat-dissipating fin assembly, and a cooling fan. The thermally conductive assembly is connected to the wireless communication module and the heat source set. The heat-dissipating fin assembly is connected to the thermally conductive assembly and arranged corresponding to the heat source set or the wireless communication module. The cooling fan normally operates at a first rotational speed for cooling to the heat-dissipating fin assembly. Upon the raising of a temperature value of the wireless communication apparatus, the method is to raise the first rotational speed to a second rotational speed, switch down the power consumption of the heat source set, and execute an event trigger, so (Continued)

as to maintain the temperature value within a proper temperature range.

17 Claims, 9 Drawing Sheets

(56) References Cited

U.S. PATENT DOCUMENTS

| | | | | |
|---|---|---|---|---|
| 2018/0006354 A1* | 1/2018 | Nivet | ............... | G06F 1/1698 |
| 2019/0067972 A1* | 2/2019 | Yajima | ............... | H02J 7/04 |
| 2019/0310694 A1* | 10/2019 | Davis | ............... | G01K 13/00 |
| 2020/0142450 A1* | 5/2020 | Dan | ............... | G06F 30/00 |

FOREIGN PATENT DOCUMENTS

| | | | |
|---|---|---|---|
| CN | 103379804 B | | 8/2016 |
| CN | 107168109 A | | 9/2017 |
| JP | 2008299612 A | | 12/2008 |
| JP | 2009163589 A | | 7/2009 |
| JP | 201588835 A | | 5/2015 |
| TW | 385384 B | | 3/2000 |
| TW | I510163 B | | 11/2015 |
| WO | 2009143487 A2 | | 11/2009 |

OTHER PUBLICATIONS

Extended European Search Report of corresponding European Patent Application No. 21164855.5 dated Dec. 21, 2021.
Office Action of corresponding Japan patent application No. 2021-074560 dated May 10, 2022.

* cited by examiner

THERMAL MANAGEMENT METHOD FOR MULTIPLE HEAT SOURCES AND WIRELESS COMMUNICATION APPARATUS HAVING MULTIPLE HEAT SOURCES

CROSS-REFERENCE TO RELATED APPLICATION

This non-provisional application claims priority under 35 U.S.C. § 119(a) to Patent Application No. 109118211 filed in Taiwan, R.O.C. on May 29, 2020, the entire contents of which are hereby incorporated by reference.

BACKGROUND

Technical Field

The present invention relates to thermal management of wireless communication devices, and in particular, to a thermal management method for multiple heat sources and a wireless communication apparatus having multiple heat sources.

Related Art

Wireless data transmission has been widely used in electronic devices. Introduction of high-speed data transmission technologies, such as 5th generation mobile networks improves data transmission efficiency of electronic devices. However, thermal management of high-speed data transmission modules is also relatively important. A temperature needs to be maintained in a certain temperature range to maintain best efficiency.

However, existing thermal management solutions mainly focus on performance adjustment and the improvement of a heat dissipation capacity. The performance adjustment is usually to directly reduce overall operating performance of a system when a temperature reaches a threshold to reduce heat generation. Directly reducing the operating performance also causes various tasks performed by the electronic device to be slower, which affects operations of users. Improvement the heat dissipation capacity is usually an increase in a rotational speed of a cooling fan. However, the increase in the rotational speed also causes a noise, which also affects operation of users.

SUMMARY

In view of the above problems, the present invention provides a thermal management method for multiple heat sources and a wireless communication apparatus having multiple heat sources, which can effectively cool a system and maintain operating efficiency of the system.

The present invention provides a thermal management method for multiple heat sources, which is applied to a wireless communication apparatus having multiple heat sources. The wireless communication apparatus includes at least a wireless communication module, a heat source set, a thermally conductive assembly, a heat-dissipating fin assembly, and a cooling fan. The thermally conductive assembly is connected to the wireless communication module and the heat source set, the heat-dissipating fin assembly is connected to the thermally conductive assembly and configured corresponding to the heat source set or the wireless communication module, and the cooling fan normally operates at a first rotational speed to apply forced air cooling to the heat-dissipating fin assembly.

The thermal management method includes: setting a first threshold temperature, a second threshold temperature, and a third threshold temperature, where the third threshold temperature is greater than the second threshold temperature, and the second threshold temperature is greater than the first threshold temperature; performing a system detection, where the system detection includes detecting temperature values of the wireless communication module and the heat source set; determining whether the temperature value of the wireless communication module is greater than the first threshold temperature; when the temperature value of the wireless communication module is greater than the first threshold temperature, determining a second rotational speed greater than the first rotational speed, and controlling the cooling fan to operate at the second rotational speed to apply forced air cooling to the heat-dissipating fin assembly; determining whether the temperature value of the wireless communication module is greater than the second threshold temperature; when the temperature value of the wireless communication module is greater than the second threshold temperature, decreasing power consumption of the heat source set; determining whether the temperature value of the wireless communication module is greater than the third threshold temperature; and when the temperature value of the wireless communication module is greater than the third threshold temperature, executing an event trigger.

In at least one embodiment of the present invention, the thermal management method for multiple heat sources further includes disposing another cooling fan corresponding to the wireless communication module.

In at least one embodiment of the present invention, the executing the event trigger includes detecting a noise of the cooling fan to obtain a volume of the noise, setting an upper volume limit, and increasing the second rotational speed to a third rotational speed, where the third rotational speed is set in such a way that the volume of the noise is not greater than the upper volume limit.

The present invention provides another thermal management method for multiple heat sources, which is applied to a wireless communication apparatus having multiple heat sources. The wireless communication apparatus includes at least a wireless communication module, a heat source set, a thermally conductive assembly, and a heat-dissipating fin assembly. The thermally conductive assembly is connected to the wireless communication module and the heat source set, and the heat-dissipating fin assembly is connected to the thermally conductive assembly and configured corresponding to the heat source set.

The thermal management method includes: setting a second threshold temperature and a third threshold temperature, where the third threshold temperature is greater than the second threshold temperature; performing a system detection, where the system detection includes detecting temperature values of the wireless communication module and the heat source set; determining whether the temperature value of the wireless communication module is greater than the second threshold temperature; when the temperature value of the wireless communication module is greater than the second threshold temperature, decreasing power consumption of the heat source set; determining whether the temperature value of the wireless communication module is greater than the third threshold temperature; and when the temperature value of the wireless communication module is greater than the third threshold temperature, executing an event trigger.

In at least one embodiment of the present invention, the executing the event trigger includes sending a warning message.

In at least one embodiment of the present invention, the executing the event trigger further includes further decreasing the power consumption of the heat source set.

In at least one embodiment of the present invention, the executing the event trigger further includes decreasing a transmission speed of the wireless communication module.

The present invention further provides a wireless communication apparatus having multiple heat sources, including a wireless communication module, a heat source set, a thermally conductive assembly, a heat-dissipating fin assembly, and a thermal management module. The wireless communication module is configured to perform wireless communication. The thermally conductive assembly includes at least one heat pipe and multiple thermally conductive sheets. The thermally conductive sheets are respectively in contact with the wireless communication module and the heat source set, and the at least one heat pipe is connected to all of the thermally conductive sheets. The heat-dissipating fin assembly is connected to the thermally conductive assembly and is configured corresponding to the heat source set or the wireless communication module. The thermal management module is connected to the wireless communication module and the heat source set through signals and is configured to adjust power consumption of the wireless communication module and the heat source set.

The thermal management module sets a second threshold temperature and a third threshold temperature, and the third threshold temperature is greater than the second threshold temperature. The thermal management module performs a system detection. The system detection includes detecting temperature values of the wireless communication module and the heat source set. When the temperature value of the wireless communication module is greater than the second threshold temperature, the thermal management module decreases power consumption of the heat source set. When the temperature value of the wireless communication module is greater than the third threshold temperature, the thermal management module executes an event trigger.

In at least one embodiment of the present invention, the heat source set includes a central processing unit, and the heat-dissipating fin assembly is configured corresponding to the central processing unit.

In at least one embodiment of the present invention, the wireless communication apparatus having multiple heat sources further includes a cooling fan that normally operates at a first rotational speed to apply forced air cooling to the heat-dissipating fin assembly.

In at least one embodiment of the present invention, the thermal management module further sets a first threshold temperature, and the second threshold temperature is greater than the first threshold temperature. In addition, when the thermal management module determines that the temperature value of the wireless communication module is greater than the third threshold temperature, the thermal management module determines a second rotational speed greater than the first rotational speed, and controls the cooling fan to operate at the second rotational speed to apply forced air cooling to the heat-dissipating fin assembly.

In at least one embodiment of the present invention, the wireless communication apparatus having multiple heat sources further includes a microphone configured to detect a noise of the cooling fan to obtain a volume of the noise. The executing the event trigger includes: setting an upper volume limit, and increasing the second rotational speed to a third rotational speed, where the third rotational speed is set in such a way that the volume of the noise is not greater than the upper volume limit.

In at least one embodiment of the present invention, the executing the event trigger includes sending a warning message.

In at least one embodiment of the present invention, the executing the event trigger further includes further decreasing the power consumption of the heat source set.

In at least one embodiment of the present invention, the executing the event trigger further includes decreasing a transmission speed of the wireless communication module.

According to the thermal management method for multiple heat sources of the present invention, a change in the temperature value of the wireless communication module is monitored through a system detection. When the temperature is too high, the present invention successively adopts different cooling means to control the temperature value of the wireless communication module to be within the allowable range to maintain the operating efficiency of the wireless communication module. The thermal management method for multiple heat sources adopts multiple cooling methods are adopted, which can avoid a rapid decrease in overall performance of the system or a loud noise of the fan as a result of a single cooling means.

DETAILED DESCRIPTION

A term "module" used in the following description refers to an application-specific integrated circuit (ASIC), an electronic circuit, a microprocessor, a chip that executes one or more software or firmware programs, and a circuit design. The module is configured to perform various algorithms, transformations, and/or logic processing to generate one or more signals. When the module is to be implemented by software, the module may serve as a program that can be read by the chip or the circuit design and implemented in a memory through execution of the program.

Figure 1:
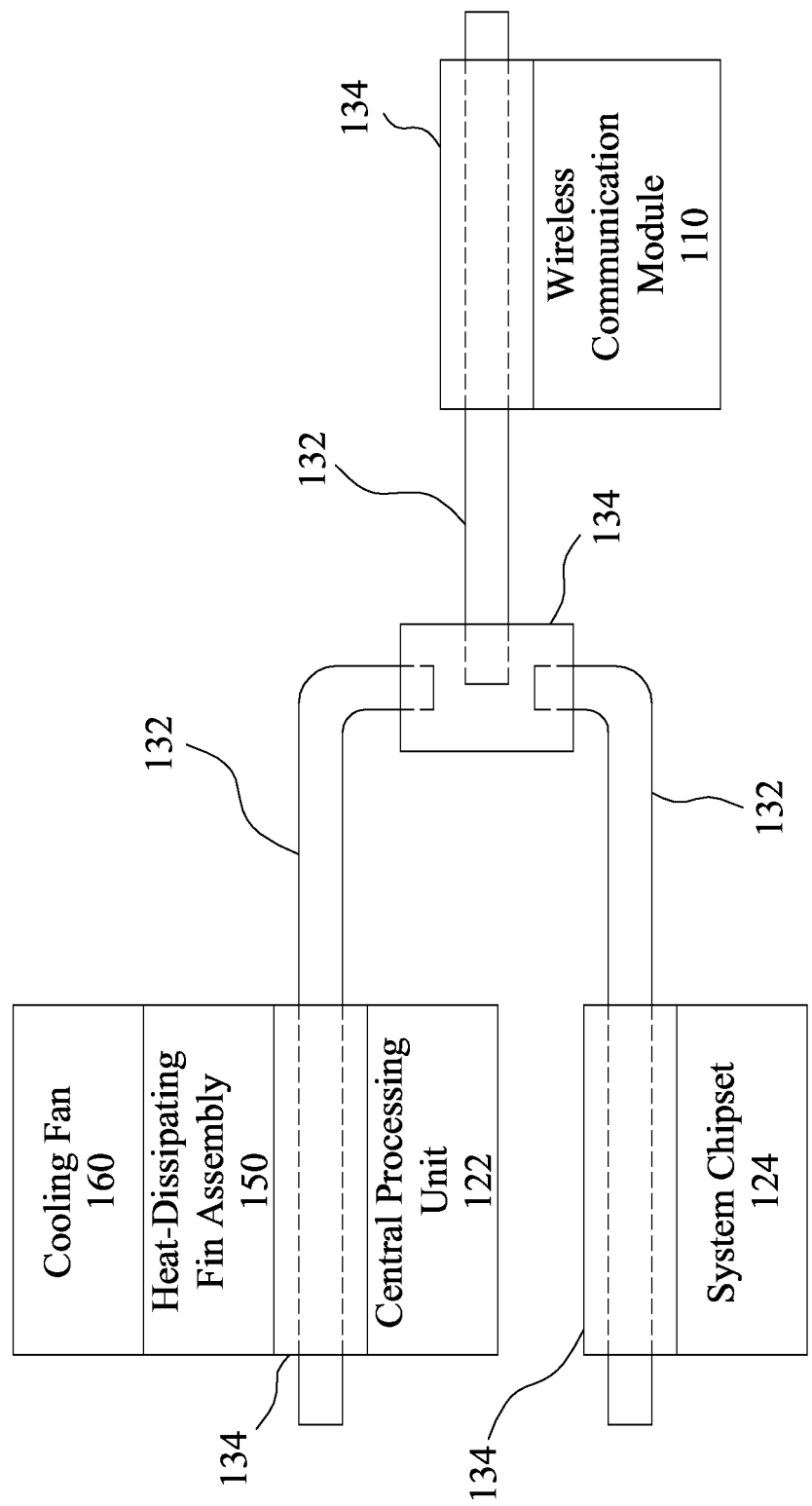
FIG. 1 is a schematic structural diagram of a wireless communication apparatus having multiple heat sources according to a first embodiment of the present invention.
Figure 2:
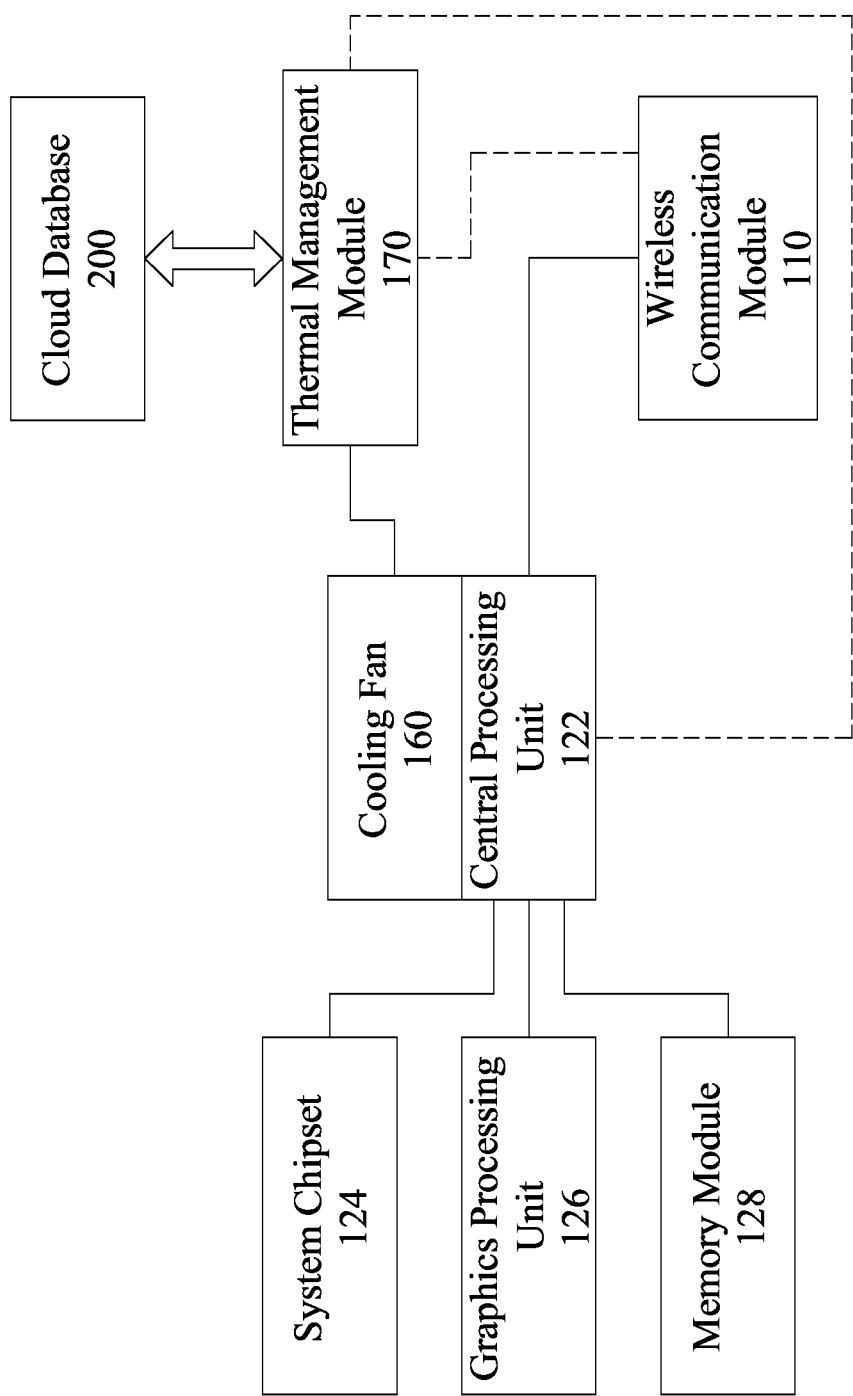
FIG. 2 is a circuit block diagram of a wireless communication apparatus having multiple heat sources according to a first embodiment of the present invention.

FIG. 1 and FIG. 2 show a wireless communication apparatus having multiple heat sources according to a first embodiment of the present invention, which can perform a thermal management method for multiple heat sources. The wireless communication apparatus having multiple heat sources includes a wireless communication module 110, a heat source set, a thermally conductive assembly, a heat-dissipating fin assembly 150, a cooling fan 160, and a thermal management module 170.

As shown in FIG. 1, the wireless communication module 110 is configured to perform wireless communication. In a specific embodiment, the wireless communication module 110 may be a 5G communication module that supports 5th generation mobile networks, or may be a 3G/4G communication module or a communication module that supports other wireless communication protocols.

As shown in FIG. 1, the heat source set includes multiple heat sources. The heat sources include but are not limited to a central processing unit 122, a system chipset 124, a graphics processing unit 126, a memory module 128, and the like. The system chipset 124 may be, but is not limited to, a combination of a south bridge and a north bridge, a platform control hub (PCH), a memory controller hub (MCH), an I/O control hub (ICH), an AMD fusion controller hub, or the like.

As shown in FIG. 1, the thermally conductive assembly includes one or more heat pipes 132 and multiple thermally conductive sheets 134. The thermally conductive sheets 134 are respectively in contact with the wireless communication module 110 and the heat source set. When the heat source set has multiple heat sources, each of the heat sources corresponds to one of the thermally conductive sheets 134, or only some of the heat sources correspond to one of the thermally conductive sheets 134. For example, in this embodiment, a thermally conductive sheet 134 is provided on each of the central processing unit 122 and the system chipset 124, and other heat sources are not configured with the thermally conductive sheet 134 and are not connected to the heat pipe 132. The thermally conductive sheet 134 is made of a material with high thermal conductivity, for example, the thermally conductive sheet 134 may be a copper sheet. The heat pipe 132 is configured to be connected to each of the thermally conductive sheets 134. When there is only one heat pipe 132, the heat pipe 132 can be properly bent so that the thermally conductive sheets 134 are respectively welded to different parts of the heat pipe 132. When there are multiple heat pipes 132, one or more thermally conductive sheets 134 may be selected to be connected to two or more heat pipes 132 at the same time, so as to achieve parallel or series connection between the heat pipes 132. The heat-dissipating fin assembly 150 is connected to the thermally conductive assembly and is configured corresponding to the heat source set, especially corresponding to the central processing unit 122. The heat pipe 132 may penetrate the heat-dissipating fin assembly 150, and the heat pipe 132 is caused to be located adjacent to the central processing unit 122. Alternatively, the heat-dissipating fin assembly 150 may be disposed on the thermally conductive sheet 134 in contact with the central processing unit 122.

As shown in FIG. 1, the cooling fan 160 is fixed to the heat-dissipating fin assembly 150 and is configured to apply forced air cooling to the heat-dissipating fin assembly 150. In the first embodiment, the cooling fan 160 normally operates at a first rotational speed to apply forced air cooling to the heat-dissipating fin assembly 150.

As shown in FIG. 2, the thermal management module 170 is connected to the wireless communication module 110, the heat source set, and the cooling fan 160 through signals. The thermal management module 170 is configured to perform a system detection to detect temperature values and power consumption of the wireless communication module 110 and the heat source set. The thermal management module 170 is further configured to adjust the power consumption of the wireless communication module 110 and the heat source set and to adjust a rotational speed of the cooling fan 160.

The thermal management module 170 may obtain the temperature value by using a temperature sensor such as a thermocouple, or may directly or indirectly obtain the temperature value via a basic input output system (BIOS) by using returns of the wireless communication module 110 and the heat source set. Similarly, the thermal management module 170 may also directly or indirectly obtain the power consumption via the basic input output system (BIOS) by using returns of the wireless communication module 110 and the heat source set. The power consumption depends on operating voltages, operating currents, or operating frequencies of the wireless communication module 110 and the heat source set. Therefore, increasing or decreasing the operating voltages, the operating currents, and/or the operating frequencies can increase or decrease the power consumption.

The thermal management module 170 may be implemented by hardware or software. During implementation of the thermal management module 170 by software, the central processing unit 122 loads program codes into the memory module 128, and executes the program codes. During implementation by software, the thermal management module 170 may be a chip or a circuit design.

Figure 3:
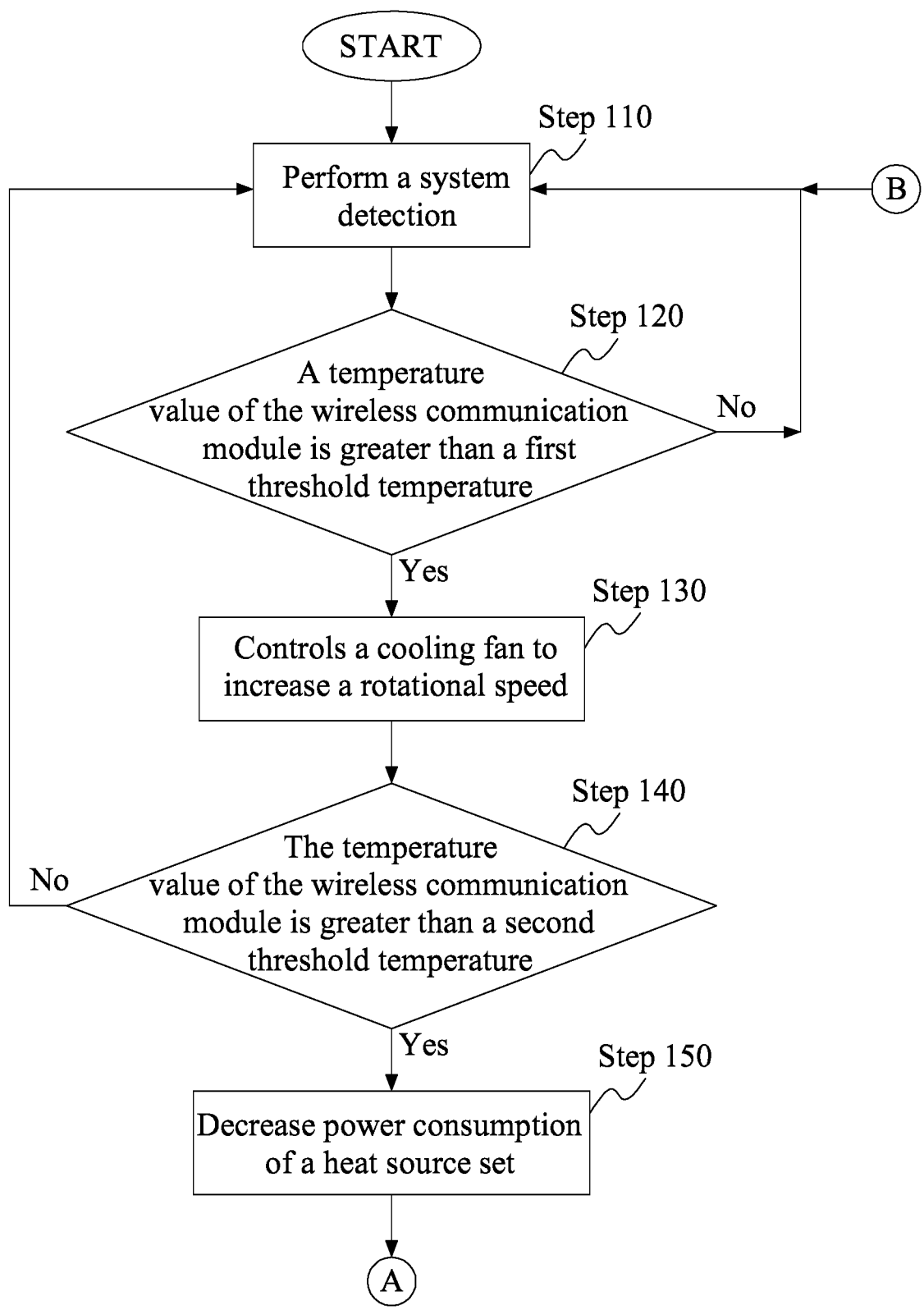
FIG. 3 and FIG. 4 are flowcharts of a thermal management method for multiple heat sources according to a first embodiment of the present invention.
Figure 4:
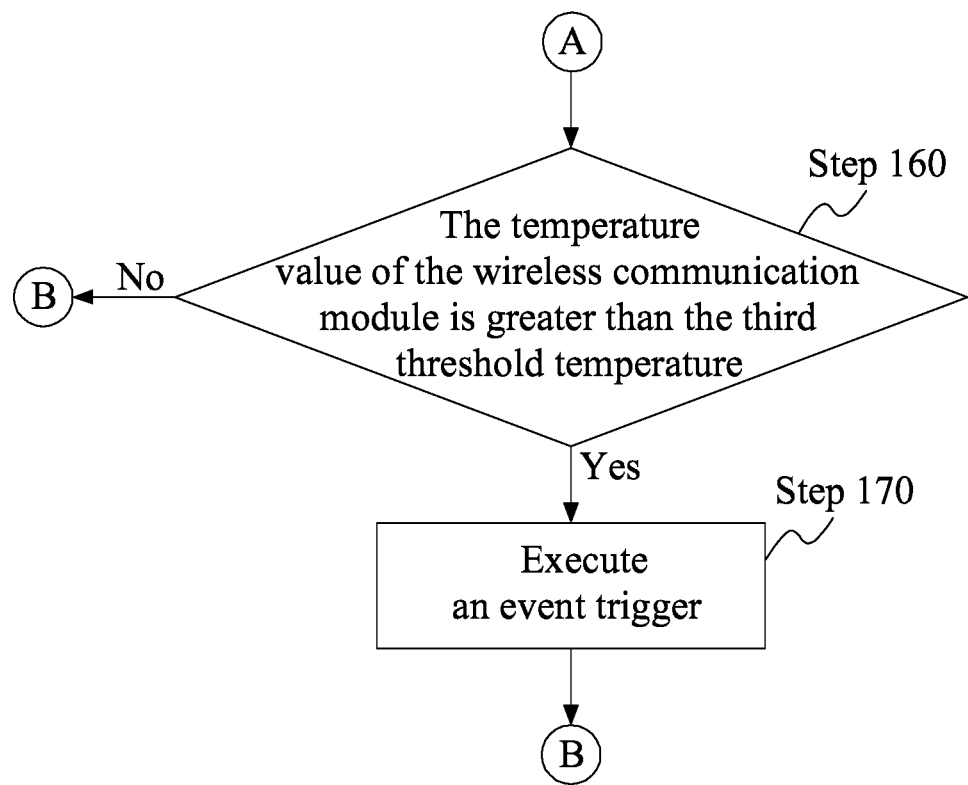

Referring to FIG. 2, FIG. 3, and FIG. 4, a process in which a wireless communication apparatus having multiple heat sources performs a thermal management method for multiple heat sources is as follows.

As shown in FIG. 3, the thermal management module 170 sets a first threshold temperature, a second threshold temperature, and a third threshold temperature in advance. The third threshold temperature is greater than the second threshold temperature, and the second threshold temperature is greater than the first threshold temperature. The thermal management module 170 performs a system detection to detect the temperature values and the power consumption of the wireless communication module 110 and the heat source set, as shown in step 110.

For example, when the wireless communication module 110 is a 5G communication module, the temperature value of the wireless communication module 110 is 60 degrees Celsius, leading to best operating performance. When the temperature value of the wireless communication module 110 exceeds 70 degrees, the performance of the wireless communication module 110 declines rapidly. Therefore, in order to maintain the operating performance of the wireless communication module 110, the temperature value needs to be prevented from exceeding 70 degrees. In this case, the thermal management module 170 may set the first threshold temperature to 70 degrees, and set an appropriate incremental temperature value (such as 5 degrees), thus successively obtaining a second threshold temperature value of 75 degrees and a third threshold temperature value of 80 degrees.

As shown in FIG. 2 and FIG. 3, the thermal management module 170 determines whether the temperature value of the wireless communication module 110 is greater than the first threshold temperature, as shown in step 120. When the temperature value of the wireless communication module 110 is greater than the first threshold temperature, the thermal management module 170 determines a second rotational speed greater than the first rotational speed, and controls the cooling fan 160 to operate at the second rotational speed to apply forced air cooling to the heat-dissipating fin assembly 150, as shown in step 130. In this step, the forced air cooling is mainly applied to the central processing unit 122. Since the heat source set and the wireless communication module 110 are connected by one or more heat pipes 132, after the temperature of the central processing unit 122 is reduced, an average temperature of the wireless communication module 110 and the heat source set is also reduced. Therefore, the temperature value of the wireless communication module 110 can be reduced.

As shown in FIG. 2 and FIG. 3, the thermal management module 170 determines whether the temperature value of the wireless communication module 110 is greater than the second threshold temperature, as shown in step 140. This step is mainly used to determine whether increasing the rotational speed of the fan can prevent the temperature of the wireless communication module 110 from continuing to increase. If the temperature continues to increase, the thermal management module 170 needs to further perform other temperature management steps. After the rotational speed of the cooling fan 160 is increased to the second rotational speed, if heat that the cooling fan can remove is still less than heat of the wireless communication module 110 and the heat source set, the temperature value of the wireless communication module 110 continues to increase.

As shown in FIG. 2 and FIG. 3, when the temperature value of the wireless communication module 110 is greater than the second threshold temperature, the thermal management module 170 decreases the power consumption of the heat source set, as shown in step 150. Decreasing the power consumption of the heat source set may be decreasing power consumption of a heat source with the greatest power consumption, for example, decreasing an operating voltage, an operating current, and/or an operating frequency of the central processing unit 122.

As shown in FIG. 2 and FIG. 4, the thermal management module 170 determines whether the temperature value of the wireless communication module 110 is greater than the third threshold temperature, as shown in step 160. When the temperature value of the wireless communication module 110 is greater than the third threshold temperature, the thermal management module 170 executes an event trigger, as shown in step 170. Whether the temperature value of the wireless communication module 110 is greater than the third threshold temperature indicates that the management plan executed by the temperature management module 170 cannot maintain the temperature value of the wireless communication module 110 to be less than the first threshold temperature. Therefore, the event trigger needs to be executed to change a management condition. The executing the event trigger includes sending a warning message to prompt the user to further decrease the power consumption of the heat source set, or to reduce the transmission speed of the wireless communication module 110. Decreasing the power consumption of the heat source set leads to a decrease in operating efficiency of the system. Decreasing the transmission speed of the wireless communication module 110 leads to a decrease in data transmission efficiency. The thermal management module 170 may automatically change the settings for the first threshold temperature, the second threshold temperature, and the third threshold temperature, which may also be manually changed by a user.

The setting for the second rotational speed mainly depends on execution performance of the wireless communication module 110 or the central processing unit 122. For example, through pre-testing, a cloud database 200 can store a comparison table of performance of the wireless communication module 110 and performance of the heat source set (the central processing unit 122 and the system chipset 124) that are separately calculated. The performance comparison table may include the operating frequency and comparative temperatures under changed loads of the central processing unit 122, comparative temperatures of the system chipset 124 at different hard disk data transmission speeds, and comparative temperatures of the wireless communication module 110 under different data transmission conditions (downloading rates and uploading rates).

By setting the performance of the wireless communication module 110 and querying the performance comparison table, the thermal management module 170 can determine optimal performance allocation of the heat source set when the wireless communication module 110 maintains the set performance, and can determine the second rotational speed in combination of a relationship between a heat removing capacity and a rotational speed of the cooling fan 160.

Figure 5:
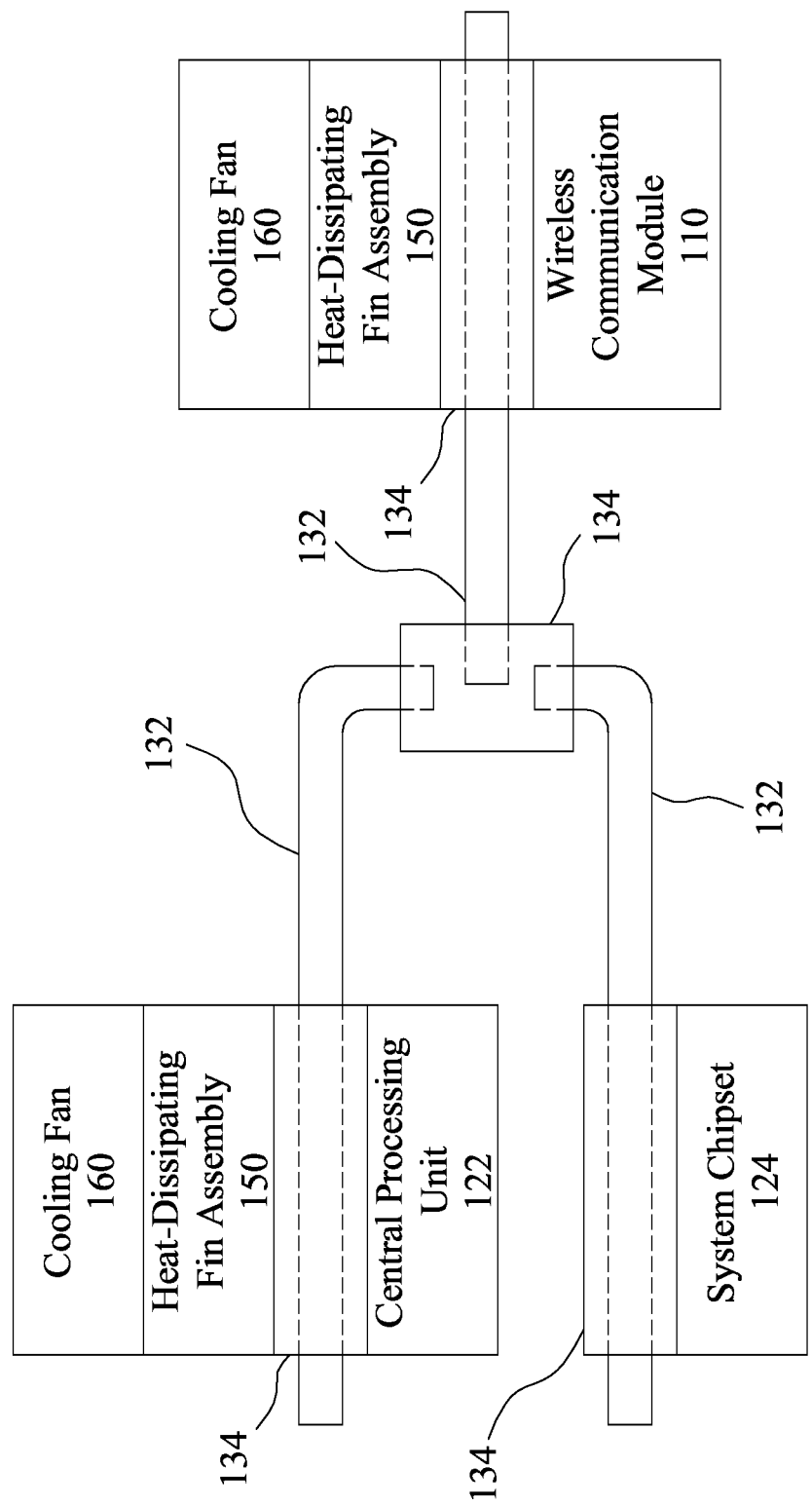
FIG. 5 is a schematic structural diagram of a wireless communication apparatus having multiple heat sources according to a second embodiment of the present invention.
Figure 6:
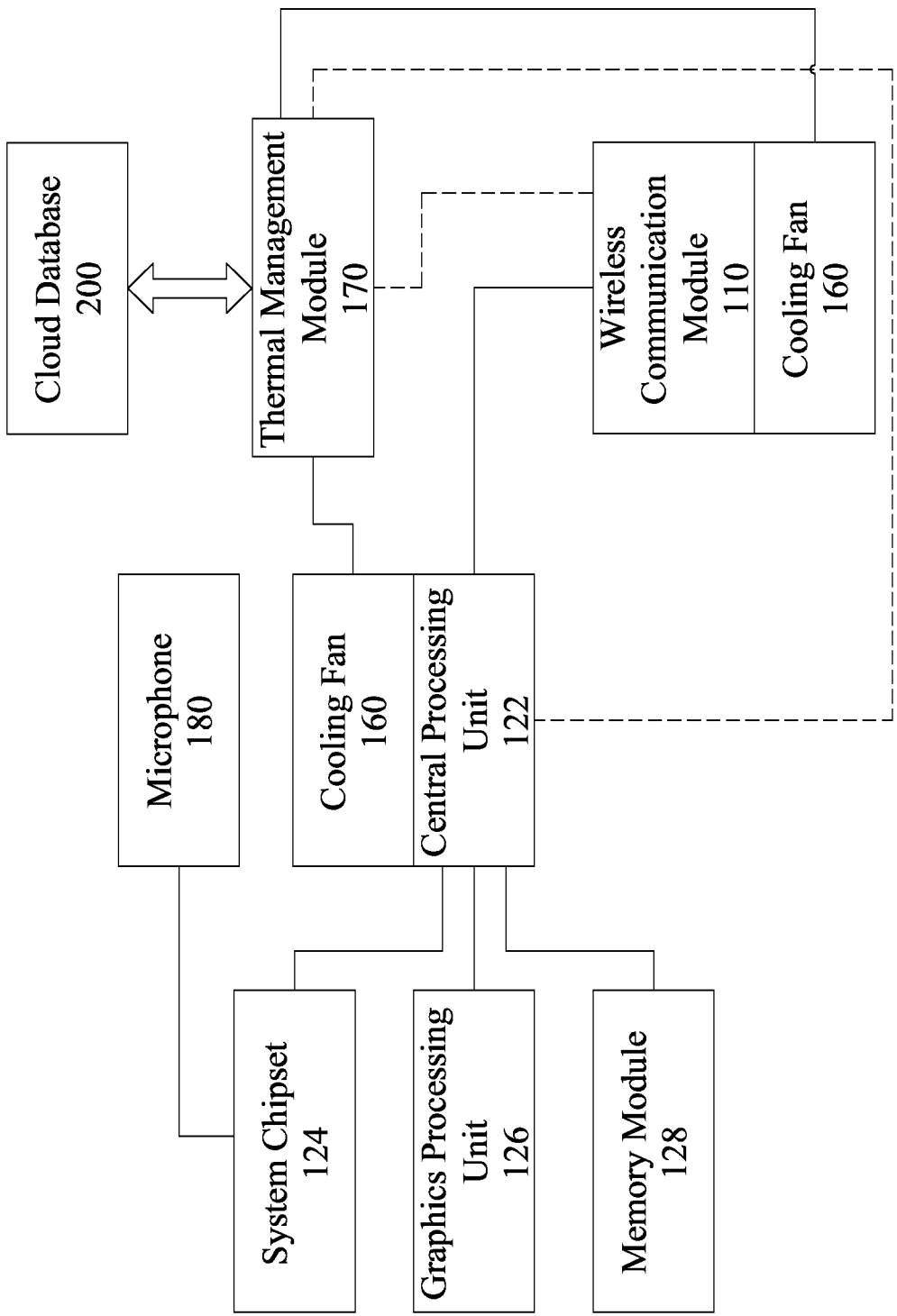
FIG. 6 is a circuit block diagram of a wireless communication apparatus having multiple heat sources according to a second embodiment of the present invention.

FIG. 5 and FIG. 6 show a wireless communication apparatus having multiple heat sources according to a second embodiment of the present invention. The wireless communication apparatus having multiple heat sources includes multiple cooling fans 160 and multiple heat-dissipating fin assembly 150. At least one of the cooling fans 160 and at least one heat-dissipating fin assembly 150 correspond to the central processing unit 122, and the at least one of the cooling fans 160 and the at least one of the heat-dissipating fin assembly 150 correspond to the wireless communication module 110. In addition, the wireless communication apparatus having multiple heat sources further includes a microphone 180 configured to detect a noise of the cooling fan 160 to obtain a volume of the noise. In step 170, since the temperature of the wireless communication module 110 exceeds the third threshold temperature, the event trigger executed by the thermal management module 170 may be a prompt that the rotational speed of the cooling fan 160 needs to be increased to maintain the transmission efficiency of the wireless communication module 110. In this case, the thermal management module 170 may provide an option for increasing the rotational speed of the cooling fan 160 for a user, and continuously receive the volume of the noise and generate a volume prompt message for the user to increase the second rotational speed to a third rotational speed. The volume of the noise is maintained within an acceptable range. Alternatively, the thermal management module 170 may set an upper volume limit. The third rotational speed is set in such a way that the volume of the noise is not greater than the upper volume limit. The above upper volume limit may be voluntarily set by the user.

In addition, in the system detection phase (step 110), the thermal management module 170 determines a type of software being executed, to determine a performance load of the wireless communication module 110 or the central processing unit 122. For example, during execution of online operations, the wireless communication module 110 needs to maintain high transmission efficiency. In this case, the performance of the central processing unit 122 is reduced. In this case, the rotational speed of the cooling fan 160, and specifically only the cooling fan 160 corresponding to the wireless communication module 110, may be increased, and the cooling fan corresponding to the central processing unit 122 is maintained at the initial first rotational speed. In this case, the rotational speed of the cooling fan 160 can be greatly increased without being restricted by the upper volume limit. Similarly, if game software is executed, the performance load of the central processing unit 122 is increased, and the wireless communication module 110 only needs to maintain low transmission efficiency. In this case, the rotational speed of the cooling fan 160, and specifically only the cooling fan 160 corresponding to the central processing unit 122, may be increased.

Figure 7:
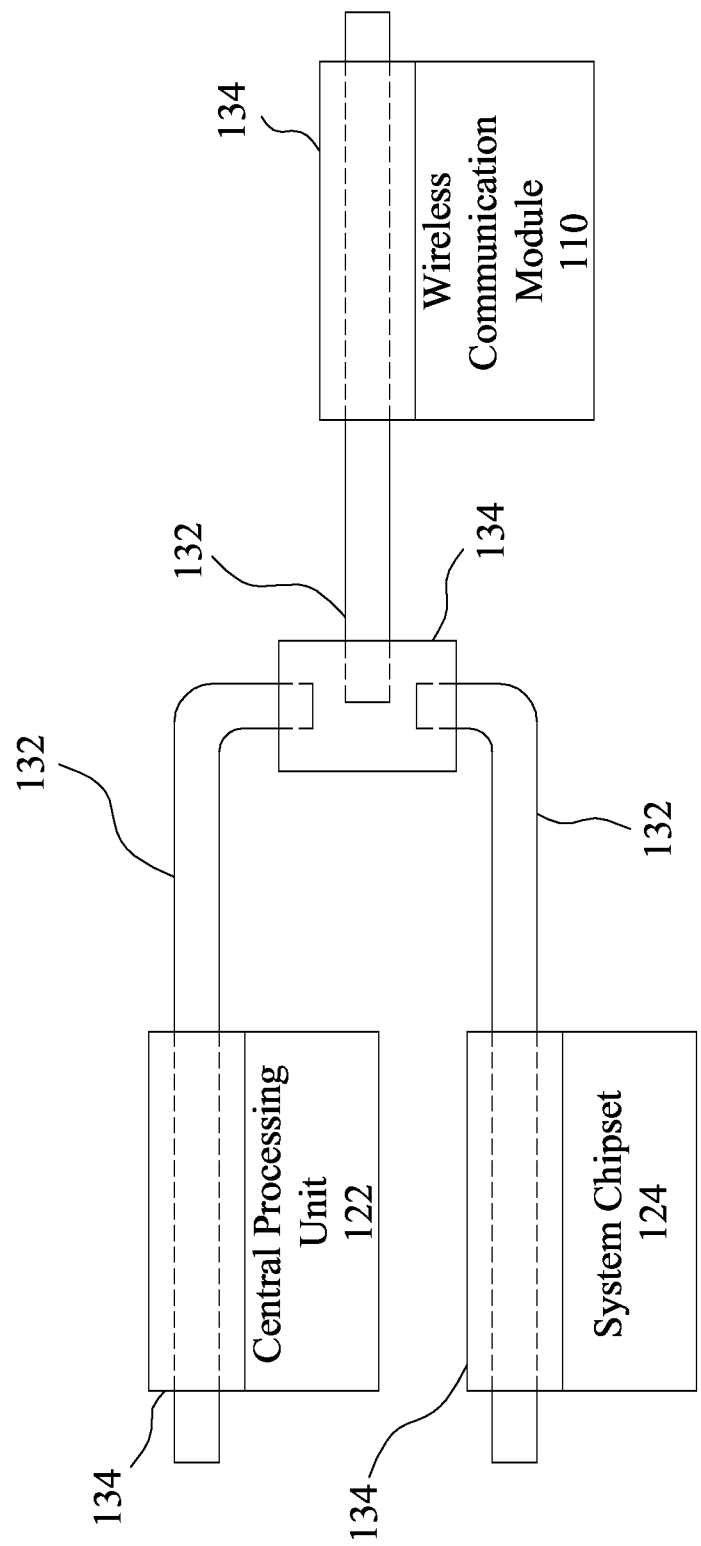
FIG. 7 is a schematic structural diagram of a wireless communication apparatus having multiple heat sources according to a third embodiment of the present invention.
Figure 8:
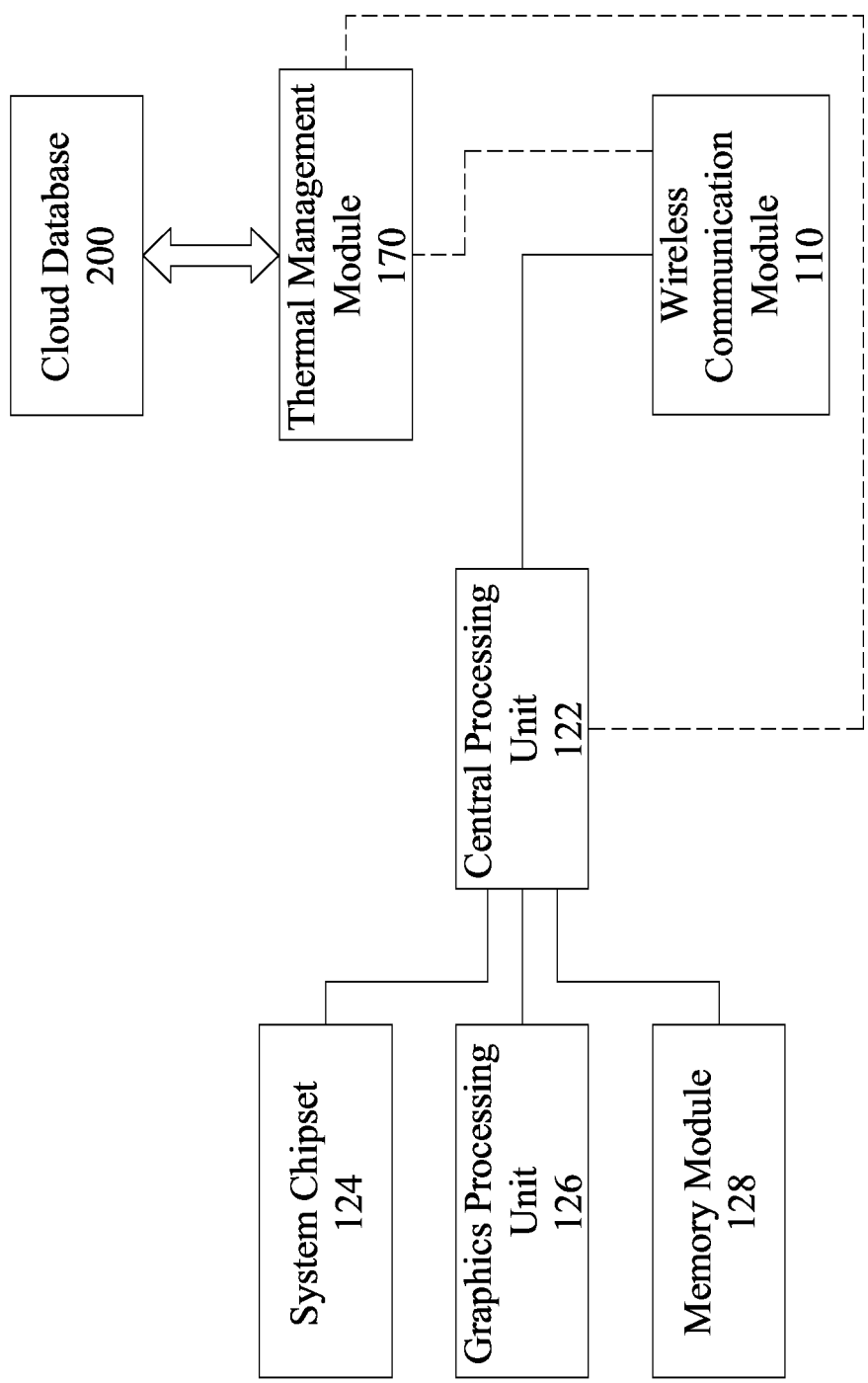
FIG. 8 is a circuit block diagram of the wireless communication apparatus having multiple heat sources according to the third embodiment of the present invention.

FIG. 7 and FIG. 8 show a wireless communication apparatus having multiple heat sources according to a third embodiment of the present invention, which can perform a thermal management method for multiple heat sources. In the third embodiment, configuration of the cooling fan 160 is omitted.

The thermal management module 170 sets only a second threshold temperature and a third threshold temperature. The third threshold temperature is greater than the second threshold temperature. The second threshold temperature at this time is set to a relatively low temperature value, which is approximately equal to the second threshold temperature in the first embodiment. The third threshold temperature may be set to be substantially the same as the third threshold temperature in the first embodiment.

Figure 9:
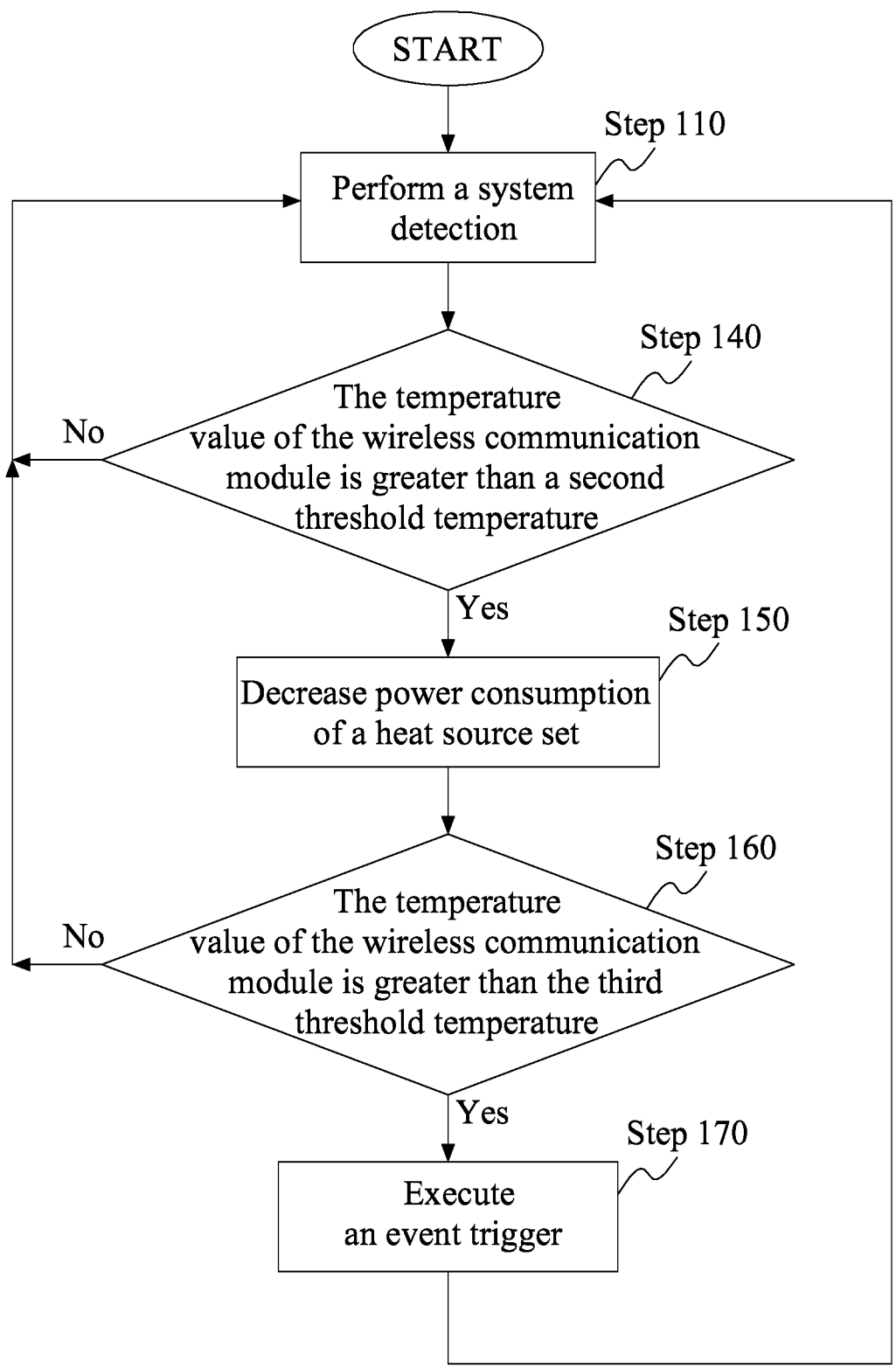
FIG. 9 is a flowchart of a thermal management method for multiple heat sources according to a third embodiment of the present invention.

As shown in FIG. 9, in the third embodiment, after the system detection is performed in step 110, step 120 and step 130 are omitted, and the thermal management module 170 directly performs step 140 to determine whether a temperature value of the wireless communication module 110 is greater than the second threshold temperature. When the temperature value of the wireless communication module 110 is greater than the second threshold temperature, the thermal management module 170 decreases power consumption of the heat source set, as shown in step 150. When the temperature value of the wireless communication module 110 is greater than the third threshold temperature, the thermal management module 170 executes an event trigger, as shown in step 160 and step 170.

According to the thermal management method for multiple heat sources of the present invention, a change in the temperature value of the wireless communication module 110 is monitored through a system detection. When the temperature is too high, the present invention successively adopts different cooling means to control the temperature value of the wireless communication module 110 to be within the allowable range to maintain the operating efficiency of the wireless communication module 110. The thermal management method for multiple heat sources adopts multiple cooling means, which can avoid a rapid decrease in overall performance of the system or a loud noise of the fan as a result of a single cooling means.

What is claimed is:

1. A thermal management method for multiple heat sources applicable to a wireless communication apparatus having multiple heat sources; wherein the wireless communication apparatus comprises at least a wireless communication module, a heat source set, a thermally conductive assembly, a heat-dissipating fin assembly, and a cooling fan, the thermally conductive assembly is connected to the wireless communication module and the heat source set, the heat-dissipating fin assembly is connected to the thermally conductive assembly and is configured corresponding to the heat source set or the wireless communication module, the cooling fan normally operates at a first rotational speed to apply forced air cooling to the heat-dissipating fin assembly, and the thermal management method comprises:

setting a first threshold temperature, a second threshold temperature, and a third threshold temperature, wherein the third threshold temperature is greater than the second threshold temperature, and the second threshold temperature is greater than the first threshold temperature;

performing a system detection, wherein the system detection comprises detecting temperature values of the wireless communication module and the heat source set;

determining whether the temperature value of the wireless communication module is greater than the first threshold temperature;

when the temperature value of the wireless communication module is greater than the first threshold temperature, determining a second rotational speed greater than the first rotational speed, and controlling the cooling fan to operate at the second rotational speed to apply forced air cooling to the heat-dissipating fin assembly;

determining whether the temperature value of the wireless communication module is greater than the second threshold temperature;

when the temperature value of the wireless communication module is greater than the second threshold temperature, decreasing power consumption of the heat source set;

determining whether the temperature value of the wireless communication module is greater than the third threshold temperature; and when the temperature value of the wireless communication module is greater than the third threshold temperature, executing an event trigger.

2. The thermal management method for multiple heat sources according to claim 1, wherein the executing the event trigger comprises:

detecting a noise of the cooling fan to obtain a volume of the noise, and setting an upper volume limit; and increasing the second rotational speed to a third rotational speed, wherein the third rotational speed is set such that the volume of the noise is not greater than the upper volume limit.

3. The thermal management method for multiple heat sources according to claim 1, wherein the executing the event trigger comprises:

sending a warning message.

4. The thermal management method for multiple heat sources according to claim 1, wherein the executing the event trigger further comprises:

further decreasing the power consumption of the heat source set.

5. The thermal management method for multiple heat sources according to claim 1, wherein the executing the event trigger further comprises:

decreasing a transmission speed of the wireless communication module.

6. A thermal management method for multiple heat sources applicable to a wireless communication apparatus having multiple heat sources, wherein the wireless communication apparatus comprises at least a wireless communication module, a heat source set, a thermally conductive assembly, and a heat-dissipating fin assembly, the thermally conductive assembly is connected to the wireless communication module and the heat source set, the heat-dissipating fin assembly is connected to the thermally conductive assembly and is configured corresponding to the heat source set, and the thermal management method comprises:

setting a second threshold temperature and a third threshold temperature, wherein the third threshold temperature is greater than the second threshold temperature;

performing a system detection, wherein the system detection comprises detecting temperature values of the wireless communication module and the heat source set;

determining whether the temperature value of the wireless communication module is greater than the second threshold temperature;

when the temperature value of the wireless communication module is greater than the second threshold temperature, decreasing power consumption of the heat source set;

determining whether the temperature value of the wireless communication module is greater than the third threshold temperature; and when the temperature value of the wireless communication module is greater than the third threshold temperature, executing an event trigger.

7. The thermal management method for multiple heat sources according to claim 6, wherein the executing the event trigger comprises:

sending a warning message.

8. The thermal management method for multiple heat sources according to claim 6, wherein the executing the event trigger further comprises:

further decreasing the power consumption of the heat source set.

9. The thermal management method for multiple heat sources according to claim 6, wherein the executing the event trigger further comprises:

decreasing a transmission speed of the wireless communication module.

10. A wireless communication apparatus having multiple heat sources, wherein the wireless communication apparatus comprises:

a wireless communication module configured to perform wireless communication;

a heat source set;

a thermally conductive assembly comprising at least one heat pipe and multiple thermally conductive sheets, wherein the thermally conductive sheets are respectively in contact with the wireless communication module and the heat source set, and the at least one heat pipe is connected to all of the thermally conductive sheets;

a heat-dissipating fin assembly connected to the thermally conductive assembly and configured corresponding to the heat source set or the wireless communication module; and a thermal management module connected to the wireless communication module and the heat source set through signals and configured to adjust power consumption of the wireless communication module and the heat source set, wherein the thermal management module sets a second threshold temperature and a third threshold temperature, wherein the third threshold temperature is greater than the second threshold temperature, and the thermal management module performs a system detection, wherein the system detection comprises detecting temperature values of the wireless communication module and the heat source set; wherein when the temperature value of the wireless communication module is greater than the second threshold temperature, the thermal management module decreases power consumption of the heat source set, and when the temperature value of the wireless communication module is greater than the third threshold temperature, the thermal management module executes an event trigger.

11. The wireless communication apparatus having multiple heat sources according to claim 10, wherein the heat source set comprises a central processing unit, and the heat-dissipating fin assembly is configured corresponding to the central processing unit.

12. The wireless communication apparatus having multiple heat sources according to claim 10, further comprising a cooling fan that normally operates at a first rotational speed to apply forced air cooling to the heat-dissipating fin assembly.

13. The wireless communication apparatus having multiple heat sources according to claim 12, wherein the thermal management module further sets a first threshold temperature, the second threshold temperature is greater than the first threshold temperature, and when the thermal management module determines that the temperature value of the wireless communication module is greater than the first threshold temperature, the thermal management module determines a second rotational speed greater than the first rotational speed, and controls the cooling fan to operate at the second rotational speed to apply forced air cooling to the heat-dissipating fin assembly.

14. The wireless communication apparatus having multiple heat sources according to claim 13, further comprising a microphone configured to detect a noise of the cooling fan to obtain a volume of the noise, wherein the executing event trigger comprises setting an upper volume limit and increasing the second rotational speed to a third rotational speed, wherein the third rotational speed is set such that the volume of the noise is not greater than the upper volume limit.

15. The wireless communication apparatus having multiple heat sources according to claim 10, wherein the executing the event trigger comprises:

sending a warning message.

16. The wireless communication apparatus having multiple heat sources according to claim 10, wherein the executing the event trigger further comprises:

further decreasing the power consumption of the heat source set.

17. The wireless communication apparatus having multiple heat sources according to claim 10, wherein the executing the event trigger further comprises:

decreasing a transmission speed of the wireless communication module.

* * * * *